United States Patent [19]
Eklund

[11] 3,800,067
[45] Mar. 26, 1974

[54] METHOD OF MANUFACTURING AN ELECTRICALLY INSULATED METALLIC CONDUCTOR WITH THE INSULATION ADHERING TO THE CONDUCTOR, AND PRODUCT

[75] Inventor: Jon Arthur Eklund, West Chelmsford, Mass.

[73] Assignee: General Electric Company, New York, N.Y.

[22] Filed: Nov. 22, 1972

[21] Appl. No.: 308,718

[52] U.S. Cl............ 174/120 R, 156/51, 161/223, 174/110 R, 174/110 V, 174/117 A, 174/120 SR
[51] Int. Cl. .................................. H01b 7/02
[58] Field of Search...... 174/120 R, 120 SR, 117 A, 174/110 V, 110 R; 161/223; 156/51

[56] References Cited
UNITED STATES PATENTS
| | | | |
|---|---|---|---|
| 2,427,196 | 9/1947 | Cox | 174/120 R |
| 3,451,959 | 6/1969 | Wasserman | 161/223 |
| 3,485,938 | 12/1969 | Kingsley | 156/51 |
| 3,727,163 | 4/1973 | Butcher | 174/117 A |
| 3,681,515 | 8/1972 | Mildner | 174/117 A UX |

FOREIGN PATENTS OR APPLICATIONS
| | | | |
|---|---|---|---|
| 198,739 | 5/1922 | Great Britain | 174/117 A |
| 389,816 | 3/1933 | Great Britain | 174/110 R |

OTHER PUBLICATIONS
Material Handbook, McGraw Hill, N. Y., Ninth Edition, 1959, pp. 639–642

*Primary Examiner*—E. A. Goldberg
*Attorney, Agent, or Firm*—S. R. Young; R. G. Simkins; P. L. Schlamp

[57] ABSTRACT

A method of adhering electrical insulating material to a metallic conductor comprising applying rosin to the surface of the conductor and forming the insulation thereover, and the product of a conductor with the insulation adhering thereto by means of the intermediate rosin. The rosin not only bonds the insulation, but also provides a flux for soldering when the insulation is removed from the conductor.

9 Claims, 1 Drawing Figure

3,800,067
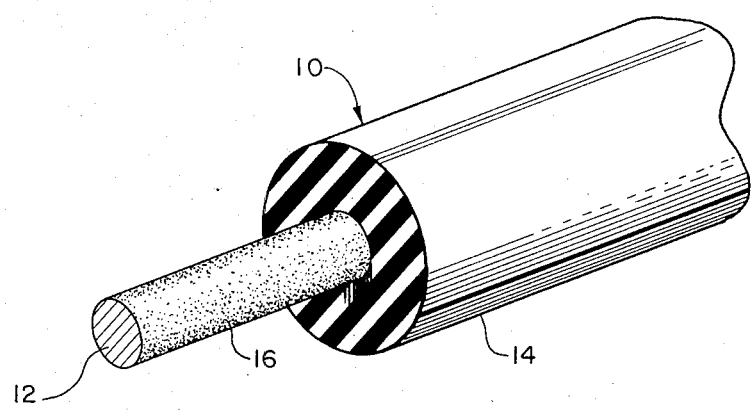

3,800,067

METHOD OF MANUFACTURING AN ELECTRICALLY INSULATED METALLIC CONDUCTOR WITH THE INSULATION ADHERING TO THE CONDUCTOR, AND PRODUCT

BACKGROUND OF THE INVENTION

Many polymeric materials commonly used as electrical insulations on metallic conductors such as wires and cable, for example polyvinyl chloride and polyethylene, do not bond with or effectively adhere to the surface of the metal conductor when applied in normal manufacturing procedures such as extruding the polymeric material about a wire of cable core. The lack of any bond or effective adherence of the insulation to the metal conductor so as to inhibit or prevent any relative movement between the insulation material and conductor either through slippage of the insulation along the conductor, or by compression or extension of the more elastic insulating material relative to the more rigid metal conductor, can be a significant handicap in some applications and in particular in certain manufacturing or fabricating and assembling operations.

For instance, high speed automatic wire stripping equipment which is typically used in preparing appliance power cords and internal power and control wiring for appliances and other apparatus from continuous coils of insulated wire, employ mechanical means such as gripping fingers and cutting blades which very rapidly grab and pull the insulated wire while cutting and stripping predetermined lengths of insulation from one or both ends of a section. This high speed pulling and handling of the insulated wire and the resulting abrupt stresses imposed during the cutting and stripping have a tendency to cause stretching or compression, and slippage of the insulation relative to the metal conductor with the frequent and unacceptable result that the designed length of the stripped section is either shortened or lengthened, and often shortened at one end and lengthened at the other end due to the longitudinal shifting of the insulation relative to the metal conductor.

For instance, U.S. Pat. No. 3,681,515 is addressed to this problem of insulation slippage.

SUMMARY OF THE INVENTION

This invention comprises the use of rosin to effectively adhere an electrical insulation to a metallic conductor. The rosin material which is preferably applied to the surface of the metallic conductor during manufacture, and thus is disposed intermediate the conductor and surrounding electrical insulation in the product, does not degrade the wire or cable product or detract from its electrical, physical or other attributes, and upon stripping, advantageously provides a prefluxed wire which is ready for soldering.

OBJECTS OF THE INVENTION

It is the primary object of this invention to provide a low cost means of effectively adhering electrical insulating material to metal conductors which does not impair other required or desired properties of the insulated conductor product, and of manufacturing an electrically insulated metallic conductor with the insulation adhering to the conductor.

It is also an object of this invention to provide an effective means of adhering and fixing an elastic or deformable organic polymeric type insulation of the metal conductor in insulated wires and cables which is not a hinderance in subsequent electrical assembling or wiring and service, and which is ready to be soldered without additional fluxing.

BRIEF DESCRIPTION OF THE DRAWING

The FIGURE illustrates a section of insulated wire in perspective view with an end of the insulation stripped from the conductor.

DESCRIPTION OF A PREFERRED EMBODIMENT

This invention comprises effectively and securely adhering an electrical insulation such as a polymeric material to a metallic conductor such as copper or aluminum wire or cable by means of rosin applied intermediate the metal conductor and insulating material.

The rosin component of the invention comprises ordinary, low cost pine rosin or so-called gum rosin, a common natural rosin obtained as a residue following the distillation of turpentine oil from crude turpentine. In the practice of this invention the rosin can be applied in any suitable and convenient form such as a solution of rosin dissolved in alcohol or other effective solvent, as a slurry or emulsion of rosin solids in a dispersing medium, as a powder or in particulate granules, or as a molten liquid since it has a moderately low melting range of about 100° to 150° C. In the manufacture of insulated wire or cable wherein the insulating material is conventionally formed about a core of the metallic strand by means of extrusion, the rosin in any of the stated forms appropriate to the system is applied directly to the surface of the metal wire strand prior to passing it through the extrusion apparatus for the application and forming of the insulation thereover. However with other modes of manufacturing or fabricating, the rosin can be applied in whatever manner is most suitable, to either the conductor or insulation, or both, prior to their union whereupon the intermediate rosin firmly and effectively adheres the components together without impeding the function or performance of either.

Suitable and preferred amounts of rosin to achieve the intended adherence comprises amounts of about 0.00002 to 0.0005 cubic inch of rosin solids per square inch of surface, and typically approximately 0.0001 cubic inch of rosin per square inch, or a surface thickness in the order of about 0.0001 inch coating of rosin, either as a continuous or discontinuous film. In any case the quantity should be sufficient to provide the desired degree of bonding to fix the insulation on the conductor and excess amounts should be avoided because of the unnecessary expense, added solvent or dispersing medium removal, and its possible detriment in subsequent operations such as extrusion or in service.

Any appropriate means or techniques may be utilized to apply the rosin including flooding or a controlled flow of rosin solution or slurry upon the wire, immersion of the wire into a solution, slurry or fluidized bed of rosin, the use of brushes, rolls or spray apparatus, and substantially any type of coating system.

Referring to the drawing, a section 10 of a typical insulated wire product of this invention is illustrated comprising a metallic conductor 12, with an overlying covering of the insulating material 14, and intermediate the surface of the conductor and layer of insulation is a thin coating 16 of rosin adhering said components together.

The following comprises an example of a preferred embodiment of this invention. A solution of 40 percent pine tar rosin solids dissolved in alcohol, a product of Alpha Flux Company, was continuously flowed onto a moving single strand copper conductor at a rate designed to apply about 0.0001 cubic inches of rosin solids per square inch of conductor, No. 18 AWG, and after sufficient travel time to evaporate the alcohol solvent, the conductor was passing into and through a conventional extrusion apparatus and process wherein an insulating covering about 0.031 inch thick was formed thereabout with heat softened polyvinyl chloride insulating compound. The resultant insulated wire product exhibited good adherence of the insulation to the underlying metal conductor which effectively resisted movement therebetween when the wire product was run through high speed automatic stripping equipment in the fabrication of appliance power cords.

Although a polyvinyl chloride insulating composition was used in the illustration, it is to be understood that the invention applies to substantially all types of organic polymeric insulating compositions including polyethylene, ethylene-propylene rubber, ethylene vinyl acetate, chlorosulfonated polyethylene and the like.

Moreover, the invention also applies to insulated wire and cable products wherein the conductor is composed of multiple strands of wire or metal conductors, including twisted or braided strands, as well as solid conductors. However, because of the possibility of some loss of rosin within the intersticies between the strands, greater amounts of rosin may be needed to achieve the same degree of adherence.

Although the invention has been described with reference to certain specific embodiments thereof, numerous modifications are possible and it is desirable to cover all modifications falling within the spirit and scope of this invention.

What I claim as new and desire to secure by Letters Patent of the United States is:

1. A method of manufacturing an electrically insulated metallic conductor with the insulation adhering to the conductor, comprising the steps of applying rosin to the surface of the metallic conductor and thereafter forming an electrical insulating material about the rosin-containing surface of the metallic conductor.

2. The method of adhering an electrical insulation to a metallic conductor of claim 1, wherein said electrical insulating material is an organic polymeric material.

3. The method of adhering an electrical insulation to a metallic conductor of claim 2, wherein said rosin is applied to the surface of the metallic conductor in an amount of about 0.00002 to 0.0005 cubic inches of rosin solids per square inch of surface of the metallic conductor.

4. The method of adhering an electrical insulation to a metallic conductor of claim 2, wherein said rosin is applied to the surface of the metallic conductor as a solution of rosin in an organic solvent.

5. The method of adhering an electrical insulation to a metallic conductor of claim 4, wherein said rosin is applied to the surface of the metallic conductor as a solution of rosin in alcohol, and the organic polymeric material is formed over the rosin containing surface of the metallic conductor by extrusion.

6. The method of adhering an electrical insulation to a metallic conductor of claim 5, wherein said rosin solution is applied to the surface of the metallic conductor in an amount of approximately 0.0001 cubic inches of rosin solids per square inch of surface of the metallic conductor.

7. An insulated electrical conductor having the insulation thereof adhering to the conductor comprising the combination of a metallic conductor and a covering of organic polymeric insulating material with rosin intermediate the conductor and organic polymeric insulating material adhering the organic polymeric insulating material to the conductor.

8. The insulated electrical conductor of claim 7, wherein the rosin intermediate the conductor and organic polymeric insulating material is present in an amount of about 0.00002 to 0.0005 cubic inches of rosin solids per square inch of surface of the conductor.

9. The insulated electrical conductor of claim 8, wherein the rosin intermediate the conductor and organic polymeric insulating material comprises rosin coating in an amount of approximately 0.0001 cubic inches of rosin solids per square inch of surface of the metallic conductor.

* * * * *